C. R. HANSON.
MOISTENER.
APPLICATION FILED AUG. 20, 1915.

1,167,819.

Patented Jan. 11, 1916.
2 SHEETS—SHEET 1.

C. R. HANSON.
MOISTENER.
APPLICATION FILED AUG. 20, 1915.
1,167,819.
Patented Jan. 11, 1916.
2 SHEETS—SHEET 2.
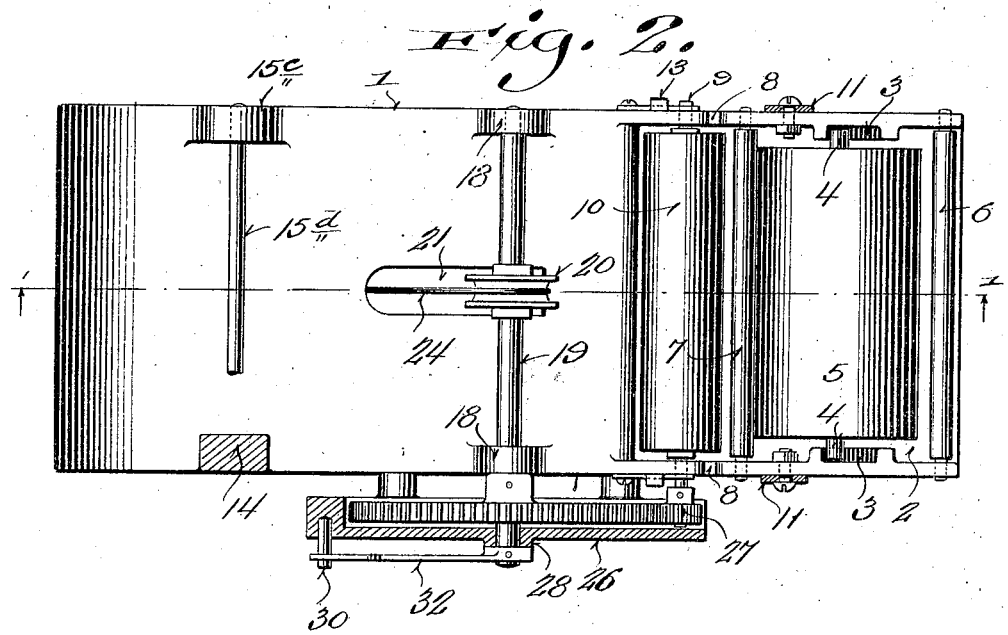
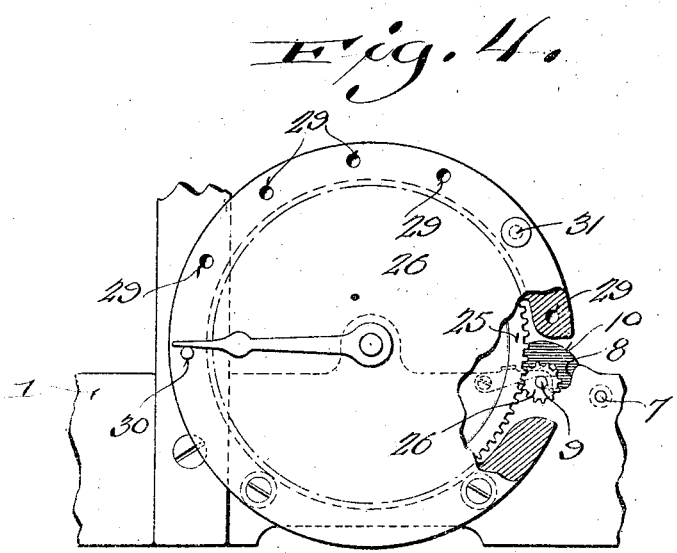

UNITED STATES PATENT OFFICE.

CLYDE R. HANSON, OF MILWAUKEE, WISCONSIN, ASSIGNOR TO CLYDE SEALING MACHINE COMPANY, OF MILWAUKEE, WISCONSIN.

MOISTENER.

1,167,819.

Specification of Letters Patent.

Patented Jan. 11, 1916.

Application filed August 20, 1915. Serial No. 46,506.

*To all whom it may concern:*

Be it known that I, CLYDE R. HANSON, a citizen of the United States, and resident of Milwaukee, in the county of Milwaukee and State of Wisconsin, have invented certain new and useful Improvements in Moisteners; and I do hereby declare that the following is a full, clear, and exact description thereof.

This invention relates to the subject of moisteners, and more particularly to that type of moisteners wherein the material to be moistened is in the form of a continuous strip mounted on a roll from which the material is dispensed as desired.

The primary aim of the invention is to provide simple means for regulating the amount of the material to be used, as well as to improve the mechanism that moistens the material.

In addition to the foregoing, the invention contemplates improvements in the cutting mechanism for the material, as well as to provide means whereby when a pre-determined amount of the material has been moistened and cut-off, the tension roll will automatically serve to hold the free end of the material from a position where it would be unsightly, or in danger of being frayed or otherwise damaged, yet at all times be in a position to be readily grasped and pulled outwardly to moisten the material.

A simple and practical embodiment of the invention has been shown in the accompanying drawings, wherein—

Figure 1:
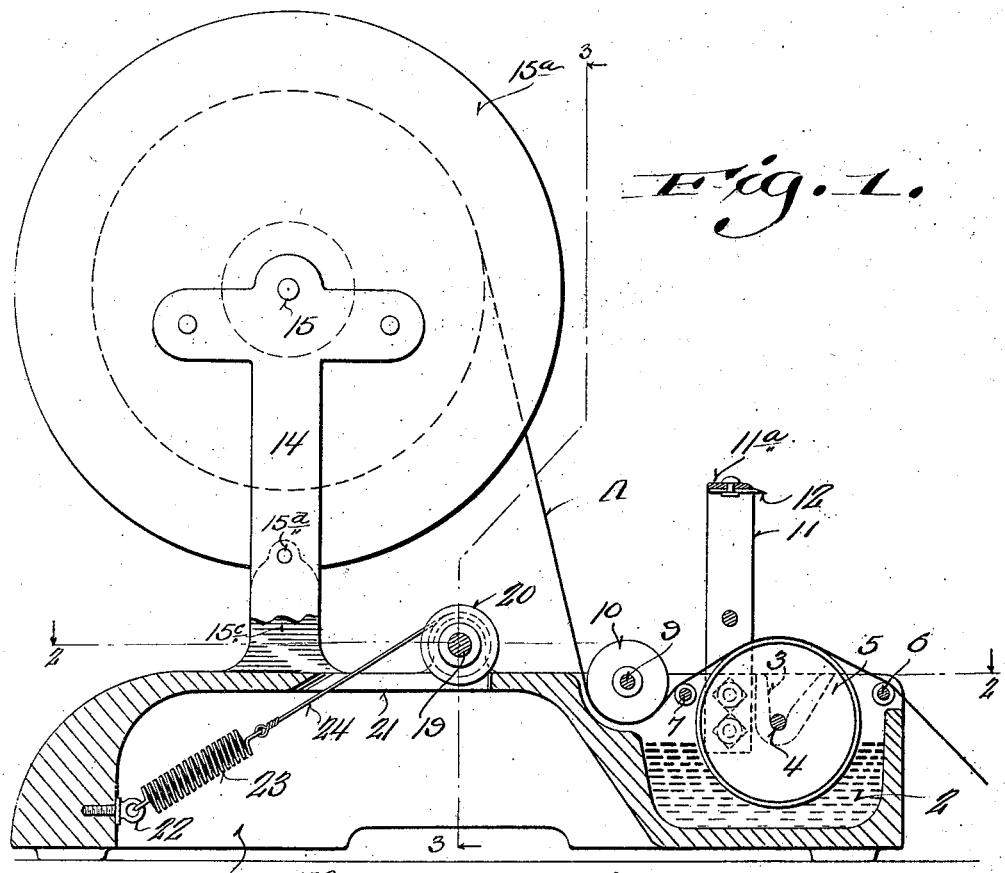
Figure 3:
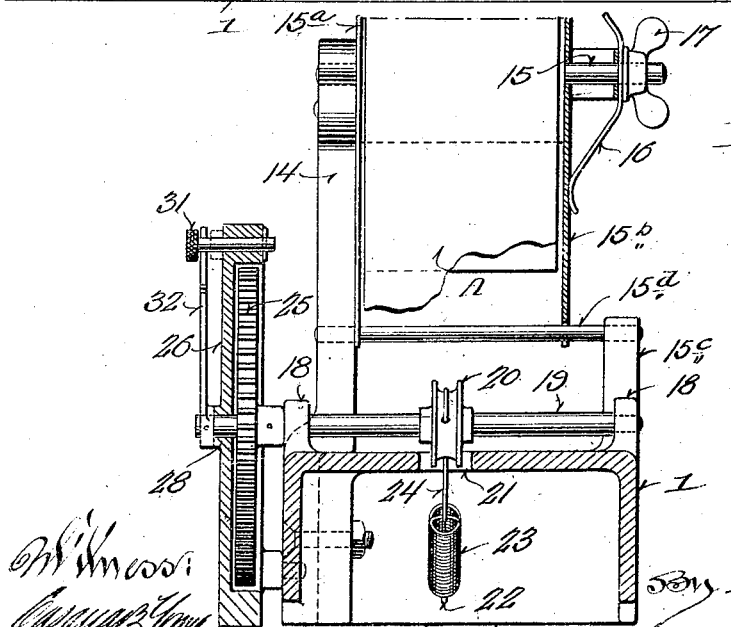

Figure 1 is a view in section of the improved moistener, the section being taken substantially on the line 1—1, Fig. 2. Fig. 2 is a top plan view. Fig. 3 is a transverse sectional view taken substantially on the line 3—3, Fig. 1. Fig. 4 is a fragmentary view in elevation, partly broken away, of the controlling mechanism for the material supply.

The improved moistener, in its preferred embodiment shown in the accompanying drawings, comprises in its general organization a base support that may be in the form of a stand, designated generally by the numeral 1, the forward end portion being made in the form of a reservoir 2. The side walls of the reservoir 2 have their upper portions provided with bearings 3 for the reception of a shaft 4 carrying a moistening roller 5, the roller 5 being so disposed that it revolves within the moistening liquid within the reservoir 2, as clearly shown in Fig. 1 of the drawings. The bearings 3, as clearly shown in Figs. 1 and 2 of the drawings may be in the form of slots integral with the walls of the reservoir 2 and being enlarged at their upper ends and contracted at their lower ends so that the shaft 4 may be readily dropped therein and normally held therein by the weight of the roller 5. The front wall of the reservoir 2 is preferably cut-away and across such cut-away portion an outer guide roller 6 extends.

It will be observed from Fig. 1 of the drawings that the disposition of the roller 6 is such that the material A is held in a position so that it will contact with and slide across the projecting upper surface of the roller 5 when being dispensed. Immediately to the rear of roller 5, a guide roller 7 extends transversely across the reservoir 2, the rollers 6 and 7 being preferably disposed in the same horizontal plane. Roller 7 is mounted in a bearing 8 formed in the side wall of the reservoir 2 and preferably such bearing 8 is in the form of a slot having a forwardly extending portion that forms the journal for said roller 7 and a rearwardly projecting portion that forms a journal for the shaft 9 of a tension roller 10. A pair of standards 11 are carried by the sides of the reservoir 2, said standards being connected at their upper ends by the horizontal bar 11ᵃ that forms a rest for the knife 12, the knife being secured to, and projecting forwardly from, the rest in any convenient manner. The standards 11 are preferably detachably connected to the sides of the reservoir in such a manner that they may be quickly dismantled, a convenient method of so attaching them being by utilizing nuts and bolts. The shaft of roller 10 is preferably releasably held to its journals by means of the latch hooks 13 that engage the projecting ends of the said shaft, as shown in Fig. 2 of the drawings.

Adjacent its rear portion, a standard is carried by one side of the stand 1, said standard having the shaft 15 of the material roll mounted thereon. The shaft 15 carries the stationary and the removable guard plates, 15ᵃ and 15ᵇ, respectively, the plate 15ᵇ being held to the shaft by the resilient arms 16 and adjusting nut 17 mounted on said shaft 15. Lugs 15ᶜ project from the stand and carry the bar 15ᵈ that extends through an opening in the stationary plate and through a slot in the removable plate, and serves as a support for said plates, in a manner well understood.

Forward of the standard 14 the stand 1 is equipped with upstanding bearings 18 which may be of the slotted type, for the shaft 19, and centrally said shaft carries a pulley 20 that is so disposed that it lies above and at the forward end of a clearance slot 21 that extends longitudinally of the top of the stand 1. The inner surface of the rear wall of the stand 1 is provided with an eye 22 to which one end of a spring 23 is attached, the other end of said spring being attached to a cable 24 that passes through the slot 21 and is partly wound around and fastened to the pulley 20. The arrangement of the pulley and spring is such that said spring opposes forward rotary movement of the pulley. Shaft 19 projects beyond one side of the stand 1 and has a master gear 25 mounted thereon, the master gear 25 being in mesh with a pinion 27 mounted on a projecting end of shaft 19. The gears 25 and 27 are inclosed in a housing 26 carried by and offset from one side of stand 1, said housing having a central hub 28 that engages shaft 19. Housing 26 is flat and circular to give the same a dial appearance, and at its upper edge portion is provided with regularly spaced opening 29 adapted to be selectively engaged by the stop 31 that governs the supply of material dispensed. The stop 30 serves to restrict the rearward movement of shaft 19. An indicator 32 is fast on shaft 19 and by contact with stops 30 and 31 limits the forward and rearward movements, respectively of said shaft.

The invention is primarily intended for use in connection with gummed paper strips, and it is preferred to use a moistening roller therefor that is not porous. It is preferred that the roller 5 be of metal, and such roller does not apply the moistening fluid evenly and smoothly, but in this invention the guide roller 6 is so disposed relatively to the roller 5 that it also acts as a spreader for the moistening fluid, as will be clear.

In operation, the stop 31 is selectively engaged with one of the openings 29 in accordance with the length of the strip of tape that is to be permitted to be severed from the roll, and the strip then grasped forwardly of roll 6 and pulled outwardly, when the limit of the supply has been reached by contact of the indicator 32 with stop 31, the tape strip is brought into contact with knife 12 and severed thereby. The outward pull on the material distends spring 23 and after the material has been severed the tension of said spring, through the cable 24, shaft 19, pulley 20, gears 25 and 27 release the tension on roller 10. In other words, the relation of roller 10 with the spring and gears and associated parts is such that an outward pull on the material is opposed and finally stopped when the indicator 32 contacts with stop 31, and when such pulling movement has ceased, the roller 10 is subjected to a retrograde movement by reason of the tension imparted to the spring by such pulling movement, which retrograde movement retracts the material and holds it in place to be readily grasped.

I claim as my invention:—

1. A moistener comprising a stand having a source of material supply and a reservoir, a moistening roller coöperating with the reservoir to moisten the material, a moisture spreading roller coöperating with the moistening roll, a tension roller engaging the material in advance of the moistening roll, and yieldable means opposing rotary movements of the tension roll.

2. A moistener comprising a source of paper supply, a reservoir, a moistening roll for operation in the reservoir, a tension roll for the material fed to the moistening roll, and means resiliently opposing a forward rotation of the tension roll to provide for reverse movement thereof.

3. A moistener comprising a stand having a forward reservoir and a rear source of material supply, a moistening roll in the reservoir, a spreading roll forward of the moistening roll, a tension roll engaging the material in advance of the moistening roll, and mechanism actuated by the forward rotation of the tension roll for opposing rotary movements of said tension roll.

4. A moistener comprising a stand provided with a reservoir, and with a source of material supply, a moistening roll in the reservoir, a tension roll engaging the material in advance of the moistening roll, gearing actuated by a forward rotation of the tension roller, means operated by the gearing for limiting the rotary movements of the tension roller, and means opposing a forward rotary movement of the tension roller.

5. A moistener comprising a stand provided with a fluid reservoir and a source of material supply, a moistening roll in the reservoir, a spreading roll coöperating with the moistening roll, a tension roll engaging the material in avance of the moistening roll, a shaft carried by the stand, a spring connection between the stand and the shaft for opposing movement of said shaft in one direction, gear connections between the shaft and the tension roll, an indicator mounted on the shaft, and stops in the forward and rear paths of movements of said indicator.

6. A moistener comprising a stand having a forward reservoir, a moistening roll coöperating with the reservoir, a material cutter carried by the reservoir, a source of material supply, means for feeding material to the moistening roll, a spreader roll carried by the reservoir, said feeding means including a tension roll, and spring-actuated mechanism for causing the tension roll to maintain a tension on the material during its forward feeding movement.

7. A moistener comprising a reservoir provided with a moistening roll and a cutter, a source of material supply, a tension roll engaging the material in advance of the moistening roll, a gear carried by the tension roll, a shaft carrying a master gear, an indicator actuated by the master gear and serving to limit rotary movements of said master gear, and yieldable means opposing rotary movements of the shaft in one direction.

8. A moistener comprising a stand provided with moistening and material supplying means, a tension roller journaled in the stand and engaging the material, spring-actuated mechanism opposing forward movement of the tension roller, and an indicator controlling said spring-actuated mechanism.

9. A moistener comprising a stand provided with moistening means and with a source of material supply, tension mechanism opposing feeding movements of the material supply, and an indication plate provided with openings, stops for selectively engaging said openings, and an indicator operated by said tension mechanism and controlling the same by abutting the stops.

In testimony that I claim the foregoing I have hereunto set my hand at Milwaukee, in the county of Milwaukee and State of Wisconsin, in the presence of two witnesses.

CLYDE R. HANSON.

Witnesses:
CASANA B. YOUNG,
M. E. DOWNEY.

Copies of this patent may be obtained for five cents each, by addressing the "Commissioner of Patents, Washington, D. C."